United States Patent Office 3,008,343
Patented Nov. 14, 1961

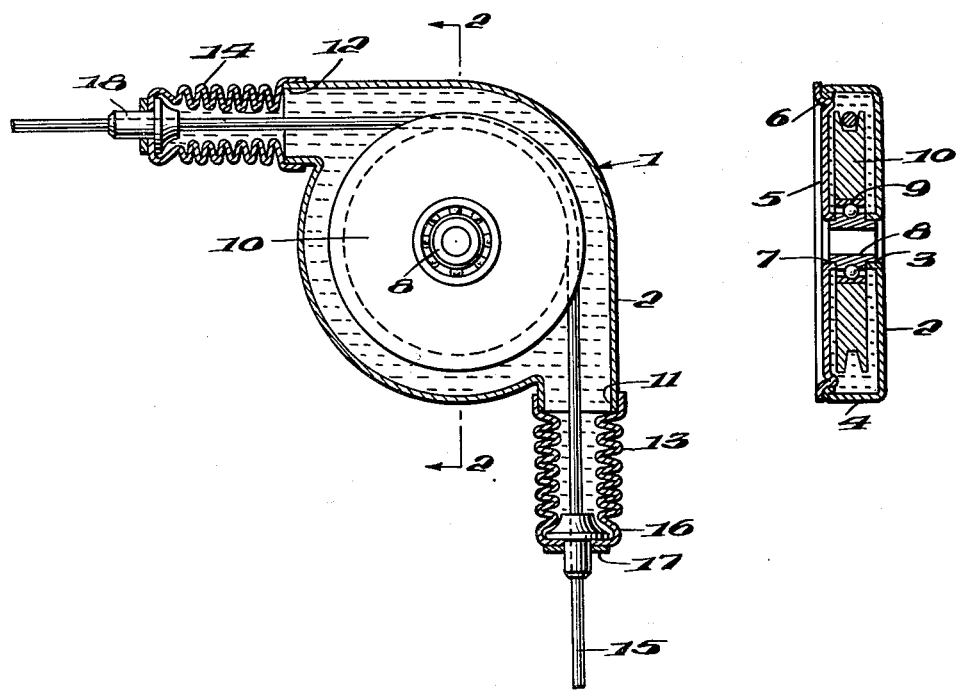

3,008,343
SEALED BEARING
Arthur J. Wasley, Bristol, Conn., assignor to Continental Engineering Corporation, Farmington, Conn.
Original application Apr. 16, 1958, Ser. No. 728,859, now Patent No. 2,960,372, dated Nov. 15, 1960. Divided and this application Dec. 3, 1959, Ser. No. 856,971
3 Claims. (Cl. 74—501)

This invention relates to a sealed bearing and more particularly to a bearing adapted to operate at high temperatures for use in airframes and the like. The present application is a division of application Serial No. 728,859 filed April 16, 1958, now Patent Number 2,960,372.

Heretofore, considerable difficulty has been encountered in connection with the use of ball bearings for airframe pulleys. Such ball bearings require lubrication and the usual grease compounds do not have the requisite temperature range. Oil systems could be used but would be exceedingly costly for such applications. Therefore, there is a very definite need in the art for a simple bearing seal which is completely effective over a wide temperature range.

According to the present invention there is provided a pulley which is completely sealed and in which the lubricating materials are under pressure so that a wider temperature range is provided. According to the present invention the pulley is disposed within a casing and a wire cord fits around the pulley and extends through two openings provided in the casing. These openings are sealed by a bellows structure secured to both the casing and the wire cord. Thus, limited movement of the cord around the pulley is provided for. The casing is evacuated of air and lubricating oil and an inert gas fills the casing. The gas is under pressure so that the flash point of the oil is raised. By using an inert atmosphere corrosion problems are eliminated and standard bearing steel or tool steels may be used to fabricate the pulley rather than more expensive corrosion resistant bearing steels.

An object of the present invention is to provide a sealed bearing for pulleys which is particularly well suited for high temperature applications.

A further object of the present invention is to provide a pulley which is completely encased wherein the lubricating fluid is under pressure so that the operating temperature may be substantially increased.

Other objects and many of the attendant advantages of the present invention will become apparent upon consideration of the following detailed specification in connection with the accompanying drawings wherein:

FIG. 1 is a sectional view showing the pulley in elevation, and FIG. 2 is a cross-sectional view along the line 2—2 of FIG. 1.

Referring now to the drawings wherein like numerals indicate like parts throughout the several views there is shown at 1 in FIG. 1 a casing. This casing is formed of two members as shown in FIG. 2 and these members comprise a plate 2 having a flanged central opening 3 with a peripheral flange 4. A cover plate 5 has an inwardly extending beaded rim 6 which cooperates with the flange 4 to form an air-tight casing 7. A cover plate 5 has a central flanged opening 7 and the flanges 3 and 7 cooperate to securely grip the inner race 8 of a ball bearing. The outer race 9 of the ball bearing is in frictional engagement with the grooved pulley wheel 10.

As shown in FIG. 1 the member 2 is provided with ports 11 and 12 and secured around these ports are bellows 13 and 14 respectively. A wire cable 15 passes through the ports 11 and 12 and around a portion of the periphery of the pulley 10. Cable 15 is secured to the bellows 13 by means of a bolt 16 having a nut 17 disposed thereon. The outer periphery of the bellows is engaged between the head on the bolt 16 and the nut 17 and the bolt is in tight frictional engagement with the cable which passes therethrough. A bolt 18 provides means for similarly gripping the bellows 14.

The chamber formed by the casing and bellows is completely air-tight and air is evacuated so that the chamber may be filled with oil and an inert gas so that the oil will be under pressure. Alternatively, the entire chamber could be filled with oil. It is preferable, however, to place the oil under pressure so as to raise the operating temperature range of the pulley. By completely enclosing the pulley and bearing in an air-tight housing and by evacuating the chamber of air, corrosion problems are substantially eliminated. Thus, it is unnecessary to use the corrosion resistant steel and standard bearing steel and tool steel may be utilized.

Obviously many modifications and variations of the present invention are possible in light of the above teachings. What is claimed as new and desired to be secured by Letters Patent is:

1. A sealed bearing for an air frame pulley comprising a casing having a pair of ports therein, a pair of resilient bellows secured to said ports, a bearing mounted in said casing, a pulley mounted on said bearing, a cable passing around a portion of the periphery of said pulley and through said openings and means securing said cable to said bellows.

2. A sealed bearing for a pulley comprising, a housing, a bearing disposed within said housing, a pulley mounted on said bearing, a cable passing over the pulley and extending through an opening in said housing, and a bellows secured to said housing and said cable whereby an airtight casing is provided for said pulley.

3. A sealed bearing for a pulley comprising, a housing including a plate having a flanged periphery and a flanged central aperture, a cover plate having a flanged central aperture, said cover plate adapted to be seated in airtight relation with respect to said plate, a bearing including inner and outer races, the flanges on the central aperture on the plate and cover plate adapted to be seated on the inner bearing race, a pulley mounted on the outer bearing race, a pair of ports in said housing, a cable extending over the pulley and through the ports, bellows secured to said housing and said cable at each of said ports and a lubricant substantially filling the housing.

References Cited in the file of this patent
UNITED STATES PATENTS 2,354,961    O'Donnell _____ Aug. 1, 1944
2,825,213    Dunn _____ Mar. 4, 1958